United States Patent
Gan et al.

(10) Patent No.: US 10,924,991 B2
(45) Date of Patent: Feb. 16, 2021

(54) STATION ASSOCIATION METHOD AND APPARATUS

(71) Applicant: Huawei Technologies Co., Ltd., Shenzhen (CN)

(72) Inventors: Ming Gan, Shenzhen (CN); Meilu Lin, Shenzhen (CN); Jia Jia, Shenzhen (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/423,717

(22) Filed: May 28, 2019

(65) Prior Publication Data
US 2019/0281549 A1    Sep. 12, 2019

Related U.S. Application Data

(63) Continuation of application No. PCT/CN2017/112592, filed on Nov. 23, 2017.

(30) Foreign Application Priority Data

Nov. 29, 2016   (CN) .......................... 201611092287.0

(51) Int. Cl.
*H04W 28/08* (2009.01)
*H04W 40/12* (2009.01)
(Continued)

(52) U.S. Cl.
CPC ......... *H04W 48/20* (2013.01); *H04W 28/085* (2013.01); *H04W 40/12* (2013.01);
(Continued)

(58) Field of Classification Search
CPC .. H04L 5/003–0098; H04W 8/18–245; H04W 24/02–10; H04W 28/02–26;
(Continued)

(56) References Cited

U.S. PATENT DOCUMENTS

| | | |
|---|---|---|
| 7,573,857 B1 | 8/2009 | Radhakrishnan et al. |
| 2008/0095048 A1 | 4/2008 | Zhong |

(Continued)

FOREIGN PATENT DOCUMENTS

| | | |
|---|---|---|
| CN | 101002431 A | 7/2007 |
| CN | 101449617 A | 6/2009 |

(Continued)

OTHER PUBLICATIONS

"Part 11: Wireless LAN Medium Access Control (MAC) and Physical Layer (PHY) Specifications," IEEE Standard for Information Technology—Telecommunications and Information Exchange between systems Local and Metropolitan area networks—Specific requirements, IEEE Standards Association, IEEE Std 802.11, 2016, 3533 pages.

(Continued)

*Primary Examiner* — Timothy J Weidner
(74) *Attorney, Agent, or Firm* — Slater Matsil, LLP

(57) ABSTRACT

Embodiments of the present application disclose a station association method and apparatus. The station association method includes: receiving a message sent by at least one access point AP, where the message carries a wake-up radio load information element, and the wake-up radio load information element includes load information of a wake-up radio channel managed by the AP; and selecting, based on the load information, a target AP from the at least one AP, so as to perform association. In the embodiments of the present application, a STA can be notified of load information of a wake-up radio channel managed by an AP, so that the STA selects an appropriate AP to perform association.

20 Claims, 5 Drawing Sheets

| Element ID | Length | Maximum sleep time of an AP equipped with a wake up receiver | ... | ... | ... |
|---|---|---|---|---|---|

(51) Int. Cl.
*H04W 40/24* (2009.01)
*H04W 48/10* (2009.01)
*H04W 48/12* (2009.01)
*H04W 48/16* (2009.01)
*H04W 48/20* (2009.01)
*H04W 52/02* (2009.01)
*H04W 74/00* (2009.01)
*H04W 74/04* (2009.01)
*H04W 84/12* (2009.01)
*H04W 88/02* (2009.01)
*H04W 88/06* (2009.01)
*H04W 88/08* (2009.01)
*H04W 88/10* (2009.01)
*H04W 92/10* (2009.01)

(52) U.S. Cl.
CPC ......... *H04W 40/24* (2013.01); *H04W 40/244* (2013.01); *H04W 40/246* (2013.01); *H04W 48/10* (2013.01); *H04W 48/12* (2013.01); *H04W 48/16* (2013.01); *H04W 52/0206* (2013.01); *H04W 52/0216* (2013.01); *H04W 52/0229* (2013.01); *H04W 74/006* (2013.01); *H04W 74/04* (2013.01); *H04W 84/12* (2013.01); *H04W 88/02* (2013.01); *H04W 88/06* (2013.01); *H04W 88/08* (2013.01); *H04W 88/10* (2013.01); *H04W 92/10* (2013.01); *Y02D 30/70* (2020.08)

(58) Field of Classification Search
CPC ... H04W 40/005–38; H04W 48/02–20; H04W 52/02–0296; H04W 56/001–0025; H04W 72/005–14; H04W 74/002–0891; H04W 84/02; H04W 84/10; H04W 84/12; H04W 88/02; H04W 88/04–12; H04W 92/02; H04W 92/04; H04W 92/10; Y02D 70/00–48
See application file for complete search history.

(56) References Cited

U.S. PATENT DOCUMENTS

| | | | |
|---|---|---|---|
| 2008/0102852 | A1 | 5/2008 | Du et al. |
| 2009/0061799 | A1* | 3/2009 | Park ................. H04W 52/0258 |
| 2011/0317600 | A1* | 12/2011 | Thomson .......... H04W 52/0235 |
| 2014/0050133 | A1 | 2/2014 | Jafarian et al. |
| 2019/0069231 | A1* | 2/2019 | Kneckt ............. H04W 52/0206 |

FOREIGN PATENT DOCUMENTS

| | | |
|---|---|---|
| CN | 104584649 A | 4/2015 |
| CN | 105578529 A | 5/2016 |
| EP | 2400799 A2 | 12/2011 |

OTHER PUBLICATIONS

Ogawa, M. et al., "Power Saving Control Method for Battery-Powered Portable Wireless LAN Access Points in an Overlapping BSS Environment," XP001561468, IEICE Transactions on Communications, Communications Society, vol. E94-B, No. 3, Mar. 2011, 9 pages.

Park, M. et al., "Proposal for Wake-Up Received (WUR) Study Group," IEEE802.11-16/0722r1, XP055563380, May 18, 2016, 14 pages.

Song, T. et al., "WUR Frame Format for Smart Scanning," IEEE Draft, IEEE802.11-17/1641r0, I vol. 802.11, XP068122345, Nov. 6, 2017, 9 pages.

* cited by examiner

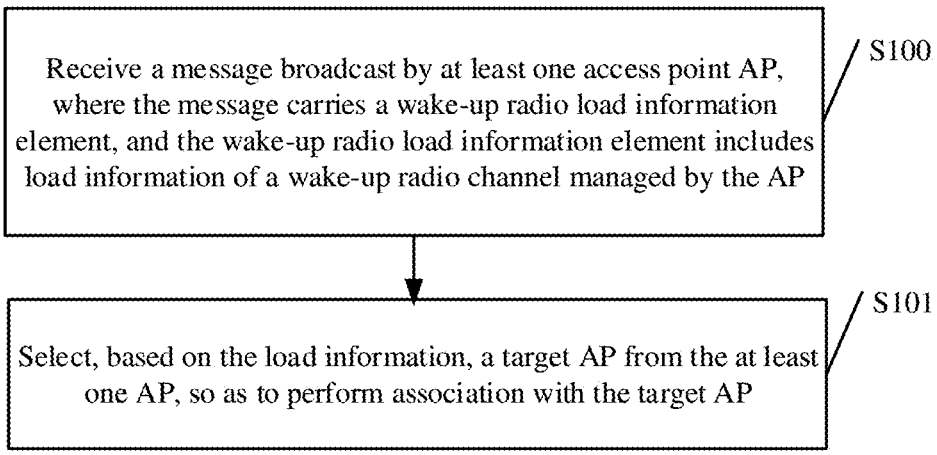

FIG. 5

| Element ID | Length | Quantity of associated stations equipped with a wake up receiver | Usage of a wake up receiver channel 1 | Usage of a wake up receiver channel 2 | ... | Usage of a wake up receiver channel n |
|---|---|---|---|---|---|---|

FIG. 6

| Element ID | Length | Quantity of associated stations equipped with a wake up receiver | Usage of a primary wake up receiver channel 1 | Usage of a secondary wake up receiver channel 1 | ... | Usage of a secondary wake up receiver channel n |
|---|---|---|---|---|---|---|

FIG. 7

| Element ID | Length | Maximum sleep time of an AP equipped with a wake up receiver | ... | ... | ... |
|---|---|---|---|---|---|

FIG. 8

STATION ASSOCIATION METHOD AND APPARATUS

CROSS-REFERENCE TO RELATED APPLICATIONS

This application is a continuation of International Application No. PCT/CN2017/112592, filed on Nov. 23, 2017, which claims priority to Chinese Patent Application No. 201611092287.0, filed on Nov. 29, 2016. The disclosures of the aforementioned applications are incorporated herein by reference in their entireties.

TECHNICAL FIELD

The present application relates to the field of wireless network technologies, and in particular, to a station association method and apparatus.

BACKGROUND

In a Wireless Fidelity (WiFi) network, a considerable portion of energy of a device is wasted on listening when no signal is received (idle listening). A related solution in a current conventional 802.11 protocol (such as 802.11b, 802.11a, 802.11g, 802.11n, and 802.11ac) focuses on device sleep policy optimization. In addition to the sleep policy optimization, another technical approach for reducing energy waste on idle listening of a device is to use a low power wake up receiver (LP-WUR) (herein referred to as a WUR). A concept of the LP-WUR is to add a low power wake up receiver (WUR) to a receive-end device (such as a STA) in addition to a conventional 802.11 transceiver end (such as an 802.11 main radio, an 802.11 main transceiver module, or a WiFi main transceiver module). As shown in FIG. 1, when the 802.11 main transceiver module enters deep sleep, the low power WUR wakes up and starts to work. If another device (such as an AP on the left of FIG. 1) needs to communicate with a device with a WUR and an 802.11 main transceiver module (such as a STA on the right of FIG. 1), the AP first sends a WUR wake up packet (WUP) to the WUR. After the WUR correctly receives the WUP sent to the WUR, the WUR wakes up the 802.11 main transceiver module of the STA, and then goes to sleep. Then, the AP communicates with the 802.11 main transceiver module that is woken up. After completing communication with the AP, the 802.11 main transceiver module goes to sleep. At the same time, the WUR wakes up and starts listening to check whether there is any WUP sent to the WUR, so as to wake up the 802.11 main transceiver module.

In this technology, the low power WUR is used to replace the 802.11 main transceiver module to listen to a channel when a medium is idle (energy consumption of the WUR in a listening/receiving state is expected to be approximately 0.1-1% of that of the 802.11 main transceiver module, that is, less than 100 uW). This can effectively reduce energy waste during idle listening of the device.

Generally, one access point (AP) manages a plurality of stations. Some stations are equipped with a wake up receiver WUR and some stations are not equipped with a wake up receiver WUR. A main transceiver and a wake up receiver possibly work on different channels. In other words, even if a channel in which the main transceiver works is busy sometimes (a busy state of the channel herein includes a busy state caused by virtual carrier sense and a busy state caused by physical carrier sense), a wake up packet can still be sent to a to-be-woken-up station. That is, a busy working channel of the main transceiver does not mean that the station cannot be sent a wake up packet in this case. In the prior art, a working channel of a wake up receiver has not been standardized yet.

SUMMARY

Embodiments of the present application provide a station association method and apparatus, to notify a STA of load information of a wake-up radio channel managed by an AP, so that the STA selects an appropriate AP to perform association.

According to a first aspect, an embodiment of the present application provides a station association method. The method is performed by a station STA, and the STA interacts with an access point AP. The STA receives a message sent by at least one AP. One AP corresponds to one message. The message may be an 802.11 beacon frame, a probe response frame, a wake-up beacon frame, or the like. The message carries a wake-up radio load information element, and the wake-up radio load information element includes load information of a wake-up radio channel managed by the AP corresponding to the message. The STA selects, based on load information in a message broadcast by each AP, a target AP from the at least one AP, so as to perform association. The target AP may be an AP in an idle wake-up radio channel.

In a possible design, a wake-up radio channel managed by one AP includes at least one channel, and load information in a message broadcast by the AP is channel usage of each of the at least one channel managed by the AP.

In another possible design, the STA selects an idle target channel based on the channel usage of each of the at least one channel managed by each AP, and performs association with a target AP corresponding to the target channel.

In another possible design, a wake-up radio channel managed by one AP includes a primary channel and at least one secondary channel, and load information in a message broadcast by the AP is channel usage of the primary channel associated with the AP and channel usage of each of the at least one secondary channel, or load information in a message broadcast by the AP is channel usage of the primary channel associated with the AP.

In another possible design, a wake-up radio channel managed by one AP includes a primary channel, and load information in a message broadcast by the AP is channel usage of the primary channel. It should be noted that the wake-up radio channel managed by the AP including a primary channel means that the AP manages one channel.

In another possible design, a wake-up radio channel managed by one AP includes a primary channel and at least one secondary channel, and the STA selects, based on channel usage of the primary channel in a message broadcast by each AP, a target AP from the at least one AP, so as to perform association.

In another possible design, a wake-up radio load information element in a wake up packet broadcast by each AP further includes a quantity of stations that are equipped with a wake up receiver and that are associated with the AP.

In another possible design, a message broadcast by each AP further includes maximum sleep time information of the AP, for example, four seconds. The maximum sleep time information may be encapsulated in a wake-up radio load information element of the message, or may be separately encapsulated in an element of the message. When a station selects a target AP to perform association, the station may select, based on load information and the maximum sleep time information in the message, the target AP from the at least one AP, so as to perform association. For example, if a service period of the station is two seconds, the station does not select an access point with a maximum sleep time being four seconds to perform association.

In another possible design, the message may include any one of an 802.11 beacon frame, a wake-up beacon frame, and a probe response frame.

According to a second aspect, an embodiment of the present application provides a station association apparatus applied to a STA. The station association apparatus includes a transceiver unit and a processing unit. The transceiver unit is configured to receive a message broadcast by at least one access point AP, where the message carries a wake-up radio load information element, and the wake-up radio load information element includes load information of a wake-up radio channel managed by the AP. The processing unit is configured to select, based on the load information, a target AP from the at least one AP, so as to perform association.

According to a third aspect, an embodiment of the present application provides a station association apparatus applied to a STA. The station association apparatus includes a memory configured to store computer executable program code, a transceiver, and a processor that is coupled with the memory and the transceiver, where the program code includes an instruction, and when the processor executes the instruction, the instruction causes the station association apparatus to perform the following operations receiving a message broadcast by at least one access point AP, where the message carries a wake-up radio load information element, and the wake-up radio load information element includes load information of a wake-up radio channel managed by the AP, and selecting, based on the load information, a target AP from the at least one AP, so as to perform association.

According to a fourth aspect, an embodiment of the present application provides a computer storage medium, configured to store a computer software instruction used by the station association apparatus provided in the second aspect, where the computer software instruction includes a program designed for executing the first aspect.

In the embodiments of the present application, the STA receives the message broadcast by the at least one AP, where the message carries the wake-up radio load information element, and the wake-up radio load information element includes the load information of the wake-up radio channel managed by the AP, and the STA selects, based on the load information, the target AP from the at least one AP, so as to perform association with the target AP. In this way, the STA may be notified of the load information of the wake-up radio channel managed by the AP, so that the STA selects an appropriate AP to perform association.

BRIEF DESCRIPTION OF THE DRAWINGS

To describe the technical solutions in the embodiments of the present application or in the background more clearly, the following briefly describes the accompanying drawings required for describing the embodiments of the present application or the background.

FIG. 5 is a flowchart of a station association method according to an embodiment of the present application;

FIG. 6 is a structural diagram of a wake-up radio load information element according to an embodiment of the present application;

FIG. 7 is a structural diagram of another wake-up radio load information element according to an embodiment of the present application;

FIG. 8 is a structural diagram of still another wake-up radio load information element according to an embodiment of the present application;

DETAILED DESCRIPTION OF ILLUSTRATIVE EMBODIMENTS

The following describes the embodiments of the present application with reference to the accompanying drawings in the embodiments of the present application.

The embodiments of the present application may be applied to a wireless local area network (WLAN). Currently, a standard used by the WLAN is the IEEE (Institute of Electrical and Electronics Engineers) 802.11 series. The WLAN may include a plurality of basic service sets (BSS). A network node in a BSS is a station, and a station may be an access point (AP) station or a non-access-point station (Non-AP STA). Each basic service set may include one AP and a plurality of non-AP STAs that are associated with the AP. It should be noted that STAs in the embodiments of the present application all are non-access-point stations, and APs in the embodiments of the present application all are access point stations.

An access point station is also referred to as a wireless access point, a hotspot, or the like. An AP is an access point for a mobile user to access a wired network. APs, with a typical coverage radius of tens to hundreds of meters, are mainly deployed in a family, a building, and a campus. Certainly, APs may also be deployed outdoors. The AP is equivalent to a bridge connecting a wired network and a wireless network. Main functions of the AP are connecting wireless network clients together, and connecting the wireless network to Ethernet. Specifically, the AP may be a terminal device or a network device that has a WiFi chip. Optionally, the AP may be a device supporting the 802.11ax standard. Further, optionally, the AP may be a device supporting multiple WLAN standards such as 802.11ac, 802.11n, 802.11g, 802.11b, and 802.11a.

The non-access-point station (Non-AP STA) may be a radio communications chip, a wireless sensor, or a wireless communications terminal, such as a mobile phone supporting a WiFi communication function, a tablet computer supporting a WiFi communication function, a set top box supporting a WiFi communication function, a smart TV supporting a WiFi communication function, a smart wearable device supporting a WiFi communication function, an in-vehicle communications device supporting a WiFi communication function, or a computer supporting a WiFi communication function. Optionally, the STA may support the 802.11ax standard. Further, optionally, the station supports multiple WLAN standards such as 802.11ac, 802.11n, 802.11g, 802.11b, and 802.11a.

With evolution of the wireless local area network WLAN standard, the IEEE 802.11 work group is preparing for research and development of the 802.11 standard with a low power wake up receiver (LP-WUR) as a core technology to reduce power consumption. An SG (study group) has been set up in IEEE for the 802.11 standard in June 2016, and a TG (task group) is expected to be set up at the end of 2016. The project is referred to as WUR.

Figure 2:
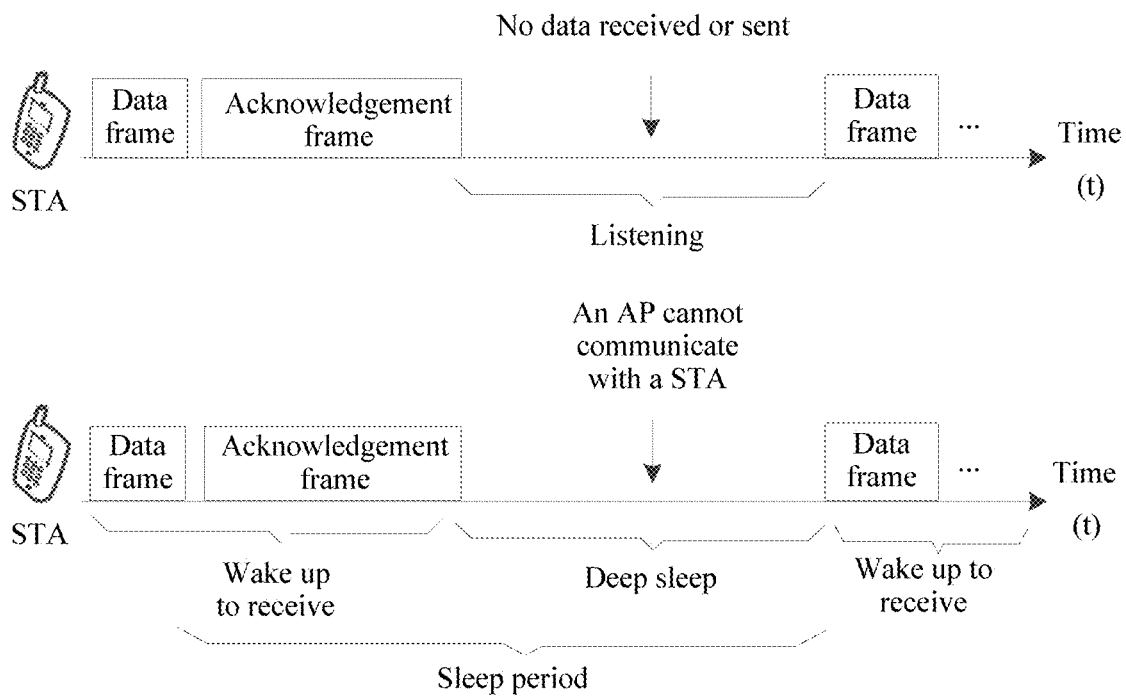
FIG. 2 is a schematic diagram of a conventional signal listening and sleep policy according to an embodiment of the present application.

In a WiFi network, a considerable portion of energy of a device is wasted on listening when no signal is received (idle listening). A related solution in a current conventional 802.11 protocol (such as 802.11b, 802.11a, 802.11g, 802.11n, and 802.11ac) focuses on device sleep policy optimization. As shown in a first time axis in FIG. 2, when a device (such as a workstation, a STA, or a station) has no message received or sent (for example, in a no-data stage), continuous listening of a channel (that is, idle listening) consumes a considerable amount of energy. Therefore, a sleep schedule is introduced in a second time axis in FIG. 2, so that the STA enters deep sleep when there is no data received or sent, so as to reduce energy consumption caused by continuous idle listening. However, when the STA is in deep sleep, the AP cannot communicate with the STA, and transmission between the AP and the STA can be performed only after the STA is woken up. This may cause a latency. To avoid a high latency caused by the sleep schedule, the STA usually follows a sleep policy to wake up from time to time to check whether there is data to receive. However, this reduces sleep efficiency of the STA (compared with a long-time sleep, waking up from time to time with no useful data to receive or send consumes more energy).

Figure 1:
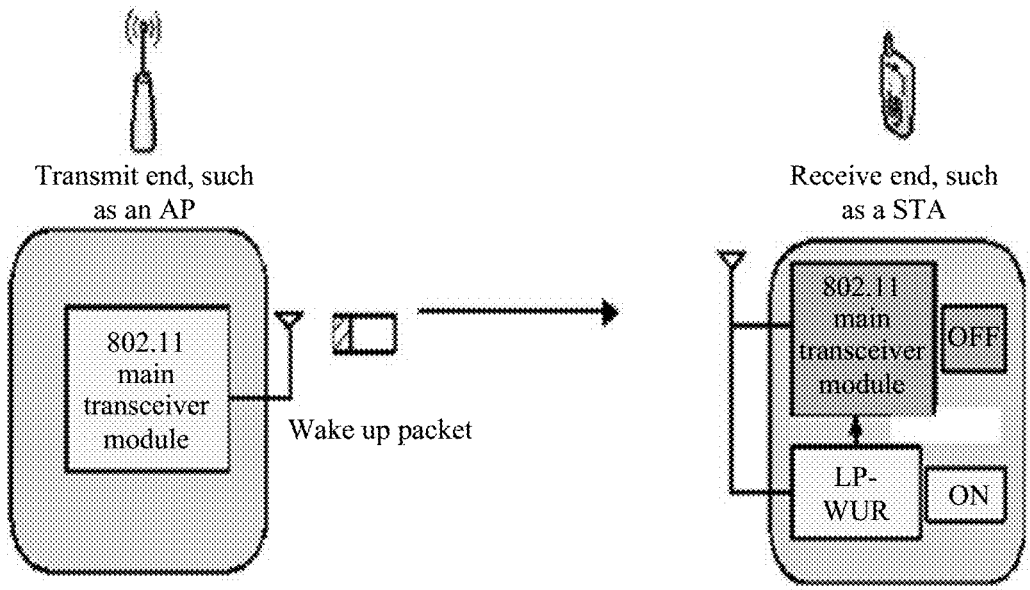
FIG. 1 is a possible schematic structural diagram of a low power receiver according to an embodiment of the present application.

In addition to sleep policy optimization, another technical approach for reducing energy waste on device idle listening is to use an LP-WUR (WUR). A concept of the LP-WUR is to add a low power wake up receiver (WUR) to a receive-end device (such as a STA) in addition to a conventional 802.11 transceiver end (such as an 802.11 main radio, an 802.11 main transceiver module, or a WiFi main transceiver module). As shown in FIG. 1, when the 802.11 main transceiver module enters deep sleep, the low power WUR wakes up and starts to work. If another device (such as an AP on the left of FIG. 1) needs to communicate with a device with a WUR and an 802.11 main transceiver module (such as a STA on the right of FIG. 1), the AP first sends a WUR wake up packet (WUP) to the WUR. After the WUR correctly receives the WUP sent to the WUR, the WUR wakes up the 802.11 main transceiver module of the STA, and then goes to sleep. Then, the AP communicates with the 802.11 main transceiver module that is woken up. After completing communication with the AP, the 802.11 main transceiver module goes to sleep. At the same time, the WUR wakes up and starts listening to check whether there is any WUP sent to the WUR, so as to wake up the 802.11 main transceiver module.

In this technology, the low power WUR is used to replace the 802.11 main transceiver module to listen to a channel when a medium is idle (energy consumption of the WUR in a listening/receiving state is expected to be approximately 0.1-1% of that of the 802.11 main transceiver module, that is, less than 100 uW). This can effectively reduce energy waste during idle listening of the device.

To implement low power consumption, a circuit structure, a frame structure (such as the WUP), and the like of the WUR need to be relatively simple and less complex. For example, the circuit structure of the WUR may merely include an energy detection part and a radio frequency (RF) part, and therefore demodulation cannot be performed for some complex modulation schemes. Therefore, an easy-to-implement binary amplitude shift keying (OOK) modulation scheme, binary phase shift keying (BPSK), or frequency shift keying (FSK) may be used for the WUP.

Figure 3A:
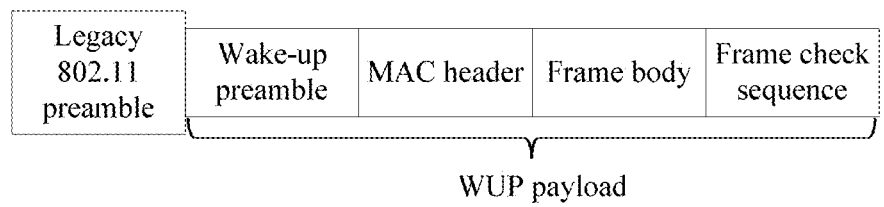
FIG. 3a is a schematic diagram of a frame structure of a wake up packet according to an embodiment of the present application.

A possible WUP frame structure is shown in FIG. 3*a*. A front part is a legacy 802.11 preamble (legacy 802.11 preamble) and can be parsed by another surrounding 802.11 device (a surrounding 802.11 device that detects the preamble through listening does not pre-empt a channel within a period of time). This protects a subsequent part of the wake up packet from being interfered with by a legacy 802.11 device. A rear part is a payload (valid payload) part of the WUP, is modulated by using OOK, and can be parsed only by the WUR. This part may include a wake-up preamble (used for identifying a WUP signal), a media access control (MAC) header (including a WUR ID that is used for distinguishing between different WURs), a frame body (a frame carrier that carries some other information), an FCS (frame check sequence, used for ensuring that received data is the same as sent data). The WUR ID information herein may be a partial or complete station association identifier, or a WUR identifier allocated by the AP to the station, or a receiving MAC address or a partial receiving MAC address of the station, or other WUR information that can be used to distinguish between different stations. In addition, the WUR payload part may be transmitted by using a narrow band, that is, different from the legacy 802.11 preamble transmitted in a basic unit of a 20M bandwidth. For example, the narrow band may be 1M, 2M, 4M, 8M, 16M, or the like. The WUR payload part may also be transmitted in a basic unit of 20M bandwidth.

Figure 3B:
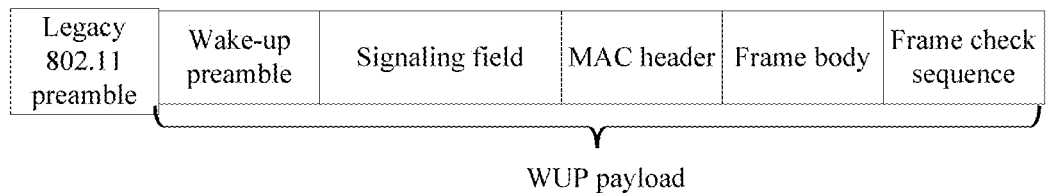
FIG. 3b is a schematic diagram of a frame structure of another wake up packet according to an embodiment of the present application.

FIG. 3*b* shows another possible WUP frame structure, including a legacy 802.11 preamble, a wake-up preamble, a signalling field (used for carrying some physical-layer signalling such as an AP identifier, a WUR ID, and a modulation and coding indication), a MAC header, a frame body, and a frame check sequence.

Figure 3C:
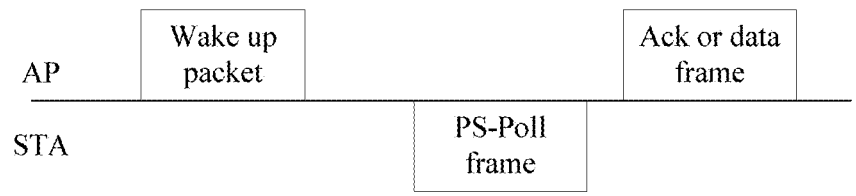
FIG. 3c is a station wake up process according to an embodiment of the present application.

In a specific wake-up radio communication process, as shown in FIG. 3*c*, an AP sends a wake-up packet to a single station STA. After receiving the wake-up packet, the STA sends a PS-Poll frame or an acknowledgement (ACK) frame to the AP to inform the AP that the STA has woken up. Then, the AP returns an ACK frame or directly sends a data frame to the STA. Alternatively, after the STA is woken up, the AP may directly send a data frame to the station, without waiting for the STA to send a PS-Poll frame.

In an actual application scenario, a main transceiver and a wake up receiver of a STA possibly work on different channels. The wake up receiver of the STA receives a wake up packet sent by an AP in a wake-up radio channel, while the main transceiver of the STA receives data from and transmits data to the AP in a main transceiver channel.

One AP manages a plurality of STAs. Some STAs are equipped with a wake up receiver and some STAs are not equipped with a wake up receiver. Sometimes, even if the main transceiver channel in which the main transceiver works is busy, it does not mean that the AP cannot send a wake up packet in this case, because the wake up packet is transmitted in a wake up radio channel. It should be noted that the busy channel herein includes a busy channel caused by virtual carrier sense, that is, a network allocation vector (NAV) is set in a previous frame, and also includes a busy channel caused by physical carrier sense, that is, the channel is actually detected to be busy.

Figure 4A:
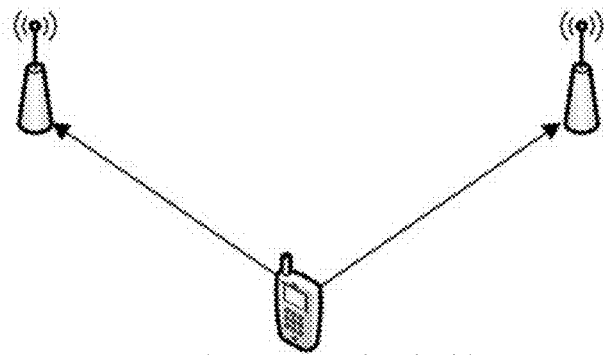
FIG. 4a is a schematic diagram of an application scenario according to an embodiment of the present application.

One STA may be in a coverage area of a plurality of APs. As shown in FIG. 4a, the STA is in a coverage area of two APs. The STA may select any AP for association, so as to perform communication. The communication may be between a main transceiver of the STA and the AP, or may be between a wake up receiver of the STA and the AP. This embodiment of the present application mainly describes how a STA equipped with a wake up receiver selects, based on load information of a wake up radio channel managed by each AP, an appropriate AP for association.

Referring to FIG. 4a, FIG. 4a includes two APs. A quantity of STAs that are equipped with a wake up receiver and that are associated with one AP is 10 and a BSS load is 70%, and a quantity of STAs that are equipped with a wake up receiver and that are associated with the other AP is 5 and a BSS load is 70%. The BSS load is a load of a main transceiver channel. This embodiment of the present application mainly proposes a new wake-up radio load information element. The wake up radio load information element includes load information of a wake-up radio channel managed by an AP. A STA may select, based on the load information of the wake-up radio channel, an appropriate AP to perform association, so as to perform wake-up radio communication with the AP.

Figure 4B:
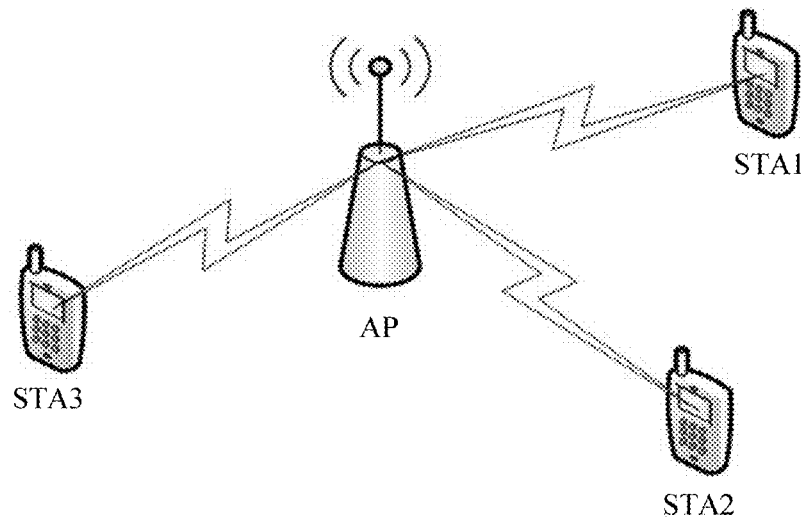
FIG. 4b is a schematic diagram of another application scenario according to an embodiment of the present application.

After the STA selects, based on the load information of the wake-up radio channel managed by the AP, a target AP to perform association, communication can be immediately performed. As shown in FIG. 4b, FIG. 4b is a schematic system diagram of a typical WLAN deployment scenario after a STA is associated with an AP. There are one AP and three STAs associated with the AP, and the AP can separately communicate with a STA1, a STA2, and a STA3. It should be noted that each STA may use a structure shown in FIG. 1, that is, including both an 802.11 main transceiver module and an LP-WUR module. The LP-WUR module is configured to receive a wake up packet sent by an AP, and wake up the 802.11 main transceiver module.

The following describes a station association method provided in an embodiment of the present application with reference to FIG. 5 to FIG. 8. It should be noted that for a wake-up radio channel including at least one channel, as mentioned in the following embodiments, each channel is a wake-up receiver channel, for a wake-up radio channel including a primary channel and at least one secondary channel, as mentioned in the following embodiments, the primary channel is a primary wake-up receiver channel and each secondary channel is a secondary wake-up receiver channel.

Referring to FIG. 5, FIG. 5 is a schematic flowchart of a station association method according to an embodiment of the present application. In this embodiment of the present application, a STA serves as an execution body. As shown in the figure, the station association method in this embodiment of the present application includes steps S100 and S101.

S100: Receive a message broadcast by at least one access point AP, where the message carries a wake-up radio load information element, and the wake-up radio load information element includes load information of a wake-up radio channel managed by the AP.

S101: Select, based on the load information, a target AP from the at least one AP, so as to perform association with the target AP.

In an embodiment, the STA is within a coverage area of at least one AP, and the STA may select the target AP from the at least one AP, so as to perform association with the target AP. Before the STA selects the target AP, the at least one AP sends a message. An AP may broadcast the message periodically or may send the message in a unicast manner.

Optionally, the message is a broadcast frame structure, for example, the message may include an 802.11 beacon frame, a probe response frame, a wake-up beacon frame, or the like. The message is a unicast frame structure, for example, the message may include a probe response frame, that is, the probe response frame is sent to the STA in a unicast manner.

The STA receives a message broadcast by the at least one AP. Each message carries a wake-up radio load information element, and the wake-up radio load information element includes wake-up radio information of the AP, such as the load information of the wake-up radio channel managed by the AP, and a quantity of STAs that are equipped with a wake up receiver and that are associated with the AP.

It should be noted that the wake-up radio load information element is carried in an 802.11 frame and may use an element form of the 802.11 frame structure, that is, element ID+length. However, if carried in a wake up packet, the wake-up radio load information element may exist in an element form similar to that of the 802.11 frame structure, or may exist in another encapsulation manner. For example, the wake-up radio load information element is not in the form of element ID+length, but in a form of type. An encapsulation form of the wake-up radio load information element is not limited in the present application. Likewise, an encapsulation form of a maximum sleep duration element of an AP mentioned in the following embodiments is not limited in the present application.

The STA may select, based on the load information in the wake-up radio load information element in the message received by the at least one AP, a target AP from the at least one AP, so as to perform association with the target AP. For example, the STA may select, from the at least one AP, a target AP that is idle and that has relatively good wake-up radio channel quality, to perform association. After the STA is associated with the target AP, the STA can perform wake-up radio communication with the target AP. For example, the AP sends a wake up packet to the STA, or the STA performs 802.11 radio communication with the target AP.

In an optional implementation, the wake-up radio channel managed by the AP includes at least one channel. Each STA-occupied channel (usually a narrow band) is fixed and may be different. Being fixed herein means being fixed in a period of time, and there is a channel switching process when a change occurs. For example, the AP manages three channels: a channel 1, a channel 2, and a channel 3. It is likely that a STA1 occupies the channel 1 and a STA2 occupies the channel 2. It should be noted that the STAs may perform wake-up radio communication with the AP in the respective occupied channels in a time division multiplexing manner or a frequency division multiplexing manner. In addition, a plurality of stations may share one channel, or even all stations share one channel.

The load information in the wake-up radio load information element may be channel usage of each of the at least one channel. When the STA selects the target AP based on the load information to perform association, the STA may select a target channel based on the load information, for example, a target channel that is relatively idle, or a target channel that is relatively idle and has good channel quality, and the STA is associated with the target AP corresponding to the target channel. It should be noted that the STA may also select the target AP based on another built-in algorithm and the channel usage of each channel to perform association.

Specifically, optionally, the message sent by the AP may include a load information element (load information element), an extended load information element (extended load information element), and a wake-up radio load information element. The load information element is a traditional load element and may specifically include an element ID (identifier) used for identifying that the element is a load information element, a length used for indicating a length of the load information element, a station quantity used for indicating a quantity of stations associated with the AP, and a usage of a main transceiver channel in which a main transceiver works.

The extended load information element is a newly-added element in 802.11ac. The extended load information element may include an element ID (identifier) used for identifying that the element is an extended load information element, a length used for indicating a length of the extended load information element, a multi-user multiple input and multiple output (MU-MIMO)-capable station quantity used for indicating a quantity of downlink (DL) MU-MIMO stations that support 801.11ac reception in the BSS, an unused spatial flow rate used for indicating a spatial flow utilization in a busy time of a primary 20 MHz channel (primary 20 MHz channel) occupied by the main transceiver, a secondary 20 MHz utilization used for indicating a utilization of a secondary 20 MHz channel, a secondary 40 MHz utilization used for indicating a utilization of a secondary 40 MHz channel, and a secondary 80 MHz utilization used for indicating a utilization of a secondary 80 MHz channel, where calculation formulas of the secondary 20 MHz utilization, the secondary 40 MHz utilization, and secondary 80 MHz utilization are similar to a calculation formula used for calculating a utilization of a channel corresponding to the load information element (the primary 20 MHz channel).

The wake-up radio load information element is shown in FIG. 6. In FIG. 6, a quantity of STAs that are equipped with a wake up receiver and that are associated with the AP corresponding to the message, and channel usage of n channels are included, where n indicates a total of n channels managed by the AP. The channel usage of each channel is:

$$\text{Channel usage} = \left| \frac{\text{Busy time of a channel}}{\begin{array}{c}\text{Quantity of beacon frame intervals} \\ \text{occupied for busy-channel measurement} \times \\ \text{Beacon frame interval} \times 1024\end{array}} \times 255 \right|$$

The beacon frame interval may be an interval at which the AP sends a wake-up beacon frame, or may be an 802.11 beacon frame interval. The beacon frame interval is measured in unit of time units (TU), and a time length of each TU is 1024 microseconds. Moreover, in the foregoing formula, the channel usage occupies one byte, and therefore a multiplier 255 is used to extend [0 1] to [0 255].

The wake-up beacon frame has a structure similar to that of the 802.11 beacon frame, and is constructed by serially-connected elements. Similar to the 802.11 frame, the wake-up beacon frame is broadcast periodically, and includes corresponding wake-up radio parameters. However, to enable the main transceiver that coexists with the wake up receiver in the same STA to work properly after being woken up, the wake-up beacon frame still needs to carry a changed key BSS parameter or a change indication bit of the BSS in which the main transceiver is located. Further, the wake-up beacon frame may further carry a time parameter, so as to implement clock synchronization between the STA and the AP.

It should be noted that the 802.11 beacon frame interval is measured in unit of TUs, while the wake-up beacon frame interval may not be measured in unit of TUs. Therefore, 1024 in a denominator needs to be correspondingly changed to a time included in the wake-up beacon frame interval. Likewise, a channel usage parameter of the 802.11 beacon frame occupies one byte. If a channel usage parameter of the wake-up beacon frame does not occupy one byte, for example, if the channel usage parameter occupies two bits, 255 in the formula needs to be replaced with 3, if the channel usage parameter occupies four bits, 255 in the formula needs to be replaced with 15, if the channel usage parameter occupies six bits, 255 in the formula needs to be replaced with 31.

Further optionally, as shown in FIG. 6, the wake-up radio load information element may further include an element ID used for identifying that the element is a wake-up radio load information element, and a length used for indicating a length of the wake-up radio load information element.

In another optional implementation, the wake-up radio channel managed by the AP includes a primary channel and at least one secondary channel. Each channel (usually a narrow band) in which the wake up receiver of the STA works is fixed, and primary channels in which wake up receivers of all STAs work are the same. However, the AP can expand a channel bandwidth based on an actual service requirement and network load. For example, the primary channel in which the wake up receiver works is a primary 5 MHz channel, but may be expanded to a 10 MHz channel or a 20 MHz channel. For another example, the primary channel is a primary 4 MHz channel, but may be expanded to an 8 MHz channel or a 16 MHz channel. It should be noted that if the wake up receiver works in only one channel, the fixed channel is the primary channel.

As shown in FIG. 7, the wake-up radio load information element in the message includes a quantity of STAs that are equipped with a wake up receiver and that are associated with the AP corresponding to the message, channel usage of a primary channel 1, channel usage of a secondary channel 1, channel usage of a secondary channel 2, . . . , and channel usage of a secondary channel n. The STA may select, based on the channel usage of the primary channel and the channel usage of the secondary channel, the target AP to perform association, that is, selects an idle target AP to perform association. Alternatively, the STA may select, based only on the channel usage of the primary channel, the target AP to perform association.

Alternatively, the wake-up radio load information element in the message merely includes the channel usage of the primary channel 1. The STA may select, based on the channel usage of the primary channel 1, the target AP to perform association, that is, selects an idle target AP to perform association.

Optionally, if a channel managed by the AP cannot be expanded to a larger bandwidth, that is, there is only the primary channel, the wake-up radio load information element includes only channel usage of one channel.

It should be noted that formulas used for calculating the channel usage of the primary channel and the channel usage of the secondary channel in this embodiment of the present application are the same as the formula used for calculating the channel usage in the foregoing implementation.

Further optionally, as shown in FIG. 7, the wake-up radio load information element may further include an element ID used for identifying that the element is a wake-up radio load information element, and a length used for indicating a length of the wake-up radio load information element.

In another embodiment, the STA is equipped with a wake up receiver, and correspondingly, the AP may also be equipped with a wake up receiver. Based on an energy saving requirement, the AP may sleep for a period of time. If a sleep time is too long, a service requirement of some STAs cannot be met. For example, if the AP sleeps for four seconds while a service period of the STA is two seconds, the AP cannot meet a service requirement of the STA.

Therefore, when the AP sends a message, the message may carry maximum sleep time information of the AP. The maximum sleep time information may be placed in a wake-up radio load information element of the message, or may be placed in another separate element. Referring to FIG. 8, FIG. 8 is a schematic structural diagram of an element that encapsulates the maximum sleep time information according to an embodiment of the present application. The element may be a wake-up radio load information element, or the element may be another separate element.

After receiving the maximum sleep time information, a STA that is not associated with an AP determines whether the maximum sleep time of an AP meets a service requirement of the STA, and then selects an appropriate target AP.

Further optionally, the STA may select an appropriate target AP based on the maximum sleep time of the AP and the load information of the wake-up radio channel managed by the AP.

In addition, when selecting the appropriate target AP to perform association, the STA still needs to consider information carried in the load information element and the extended load information element.

In the embodiments of the present application, the STA receives the message broadcast by the at least one AP, where the message carries the wake-up radio load information element, and the wake-up radio load information element includes the load information of the wake-up radio channel managed by the AP, and the STA selects, based on the load information, the target AP from the at least one AP, so as to perform association. In this way, the STA may be notified of the load information of the wake-up radio channel managed by the AP, so that the STA selects an appropriate AP to perform association.

An embodiment of the present application further provides a station association apparatus. The apparatus may be the STA described in the method in FIG. 5, or may be another device that can perform the STA actions in the method in FIG. 5.

Figure 9A:
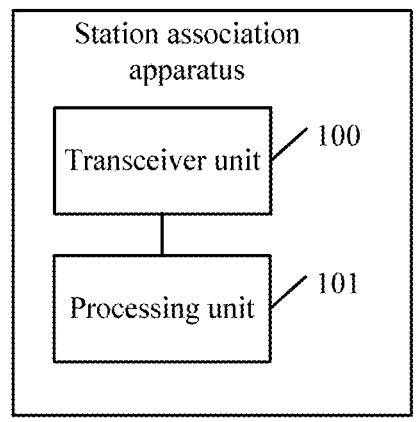
FIG. 9a is a schematic structural diagram of a station association apparatus according to an embodiment of the present application.
Figure 9B:
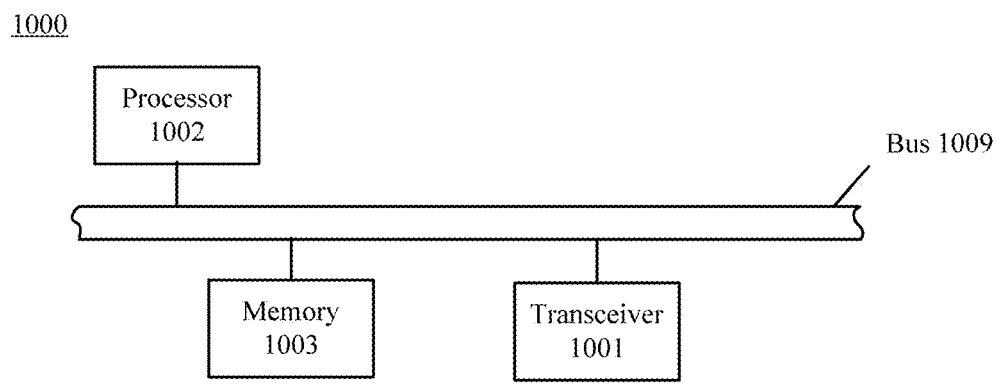
FIG. 9b is a schematic structural diagram of another station association apparatus according to an embodiment of the present application.

Referring to FIG. 9a and FIG. 9b, FIG. 9a and FIG. 9b are schematic structural diagrams of a station association apparatus according to the embodiments of the present application. As shown in FIG. 9a, the station association apparatus may include a transceiver unit 100 and a processing unit 101.

The transceiver unit 100 is configured to receive a message sent by at least one access point AP, where the message carries a wake-up radio load information element, and the wake-up radio load information element includes load information of a wake-up radio channel managed by the AP.

The processing unit 101 is configured to select, based on the load information, a target AP from the at least one AP, so as to perform association.

Optionally, the wake-up radio channel managed by the AP includes at least one channel, and the load information is channel usage of each of the at least one channel.

That the processing unit 101 selects, based on the load information, a target AP from the at least one AP, so as to perform association specifically includes selecting an idle target channel based on a value of the channel usage of each of the at least one channel, and performing association with a target AP corresponding to the target channel.

Optionally, the wake-up radio channel managed by the AP includes a primary channel and at least one secondary channel, and the load information includes channel usage of the primary channel and channel usage of each of the at least one secondary channel, or the load information includes channel usage of the primary channel.

Further optionally, that the processing unit 101 selects, based on the load information, a target AP from the at least one AP, so as to perform association specifically includes selecting, based on the channel usage of the primary channel in the load information, the target AP from the at least one AP, so as to perform association.

Optionally, the wake-up radio load information element further includes a quantity of stations that are equipped with a wake up receiver and that are associated with the AP.

Further optionally, the message further includes maximum sleep time information of the AP, and that the processing unit 101 selects, based on the load information, a target AP from the at least one AP, so as to perform association specifically includes selecting, based on the load information and the maximum sleep time information, the target AP from the at least one AP, so as to perform association.

The message includes any one of an 802.11 beacon frame, a wake-up beacon frame, and a probe response frame.

Correspondingly, as shown in FIG. 9b, the apparatus may include a transceiver 1001 and a processor 1002. The processor 1002 is configured to control operations of the apparatus, including performing data transmission (including receiving and/or sending) by using the transceiver 1001. Further, the apparatus may further include a memory 1003. The memory 1003 may include a read-only memory and a random access memory, and is configured to provide an instruction and data to the processor 1002. The memory 1003 may be integrated in the processor 1002, or may be independent of the processor 1002. A part of the memory 1003 may further include a non-volatile random access memory (NVRAM). Components of the apparatus are coupled together by using a bus system 1009. In addition to a data bus, the bus system 1009 includes a power bus, a control bus, and a status signal bus. However, for clear description, various buses are marked as the bus system 1009 in the figure.

The procedure disclosed by the embodiment of this application in FIG. 5 may be applied to the processor 1002, or may be implemented by the processor 1002. During an implementation process, the steps of the procedure implemented by the apparatus may be implemented by an integrated logical circuit of hardware in the processor 1002, or by a software instruction. The processor 1002 may be a general purpose processor, a digital signal processor, an application-specific integrated circuit, a field programmable gate array or another programmable logic device, a discrete gate or a transistor logic device, or a discrete hardware component. The processor 1002 can implement or execute the methods, steps, and logical block diagrams disclosed in the embodiments of this application. The general purpose processor may be a microprocessor, any conventional processor, or the like. The steps of the method in FIG. 5 disclosed with reference to the embodiments of this application may be directly performed by a hardware processor, or may be performed by using a combination of hardware in the processor and a software module. The software module may be in a random access memory, a flash memory, a read-only memory, a programmable read-only memory or an electrically erasable programmable memory, a register, or another mature storage medium in the art. The storage medium is located in the memory 1003. The processor 1002 reads information in the memory 1003 and completes, with reference to hardware of the processor 1002, the steps of the procedure indicated in the embodiments of the present application.

Further, when the apparatus is a user equipment STA, the apparatus may further include an input device such as a keyboard, an output device such as a display screen, and the like. Details are not described herein.

The transceiver unit 1001 is configured to receive a message sent by at least one access point AP, where the message carries a wake-up radio load information element, and the wake-up radio load information element includes load information of a wake-up radio channel managed by the AP.

The processor 1002 is configured to select, based on the load information, a target AP from the at least one AP, so as to perform association.

Optionally, the wake-up radio channel managed by the AP includes at least one channel, and the load information is channel usage of each of the at least one channel.

The processor 1002 is further configured to select an idle target channel based on a value of the channel usage of each of the at least one channel, and perform association with a target AP corresponding to the target channel.

Optionally, the wake-up radio channel managed by the AP includes a primary channel and at least one secondary channel, and the load information includes channel usage of the primary channel and channel usage of each of the at least one secondary channel, or the load information includes channel usage of the primary channel.

Optionally, the processor 1002 is further configured to select, based on the channel usage of the primary channel in the load information, the target AP from the at least one AP, so as to perform association.

Further optionally, the wake-up radio load information element further includes a quantity of stations that are equipped with a wake up receiver and that are associated with the AP.

Optionally, the message further includes maximum sleep time information of the AP, and the processor 1002 is further configured to select, based on the load information and the maximum sleep time information, the target AP from the at least one AP, so as to perform association.

The message includes any one of an 802.11 beacon frame, a wake-up beacon frame, and a probe response frame.

In this embodiment of the present application, the STA receives the message broadcast by the at least one AP, where the message carries the wake-up radio load information element, and the wake-up radio load information element includes the load information of the wake-up radio channel managed by the AP, and the STA selects, based on the load information, the target AP from the at least one AP, so as to perform association. In this way, the STA may be notified of the load information of the wake-up radio channel managed by the AP, so that the STA selects an appropriate AP to perform association.

It should be understood that "one embodiment" or "an embodiment" mentioned in the whole specification means that particular features, structures, or characteristics related to the embodiment are included in at least one embodiment of the present application. Therefore, "in one embodiment" or "in an embodiment" that appears throughout the whole specification does not necessarily mean a same embodiment. Moreover, the particular features, structures, or features may be combined in one or more embodiments in any proper manner. Sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only, that is, B may also be determined according to A and/or other information. In the embodiments of this application, "at least one of A, B, or C" indicates selecting at least one from a set (A, B, C), for example, A, B, C, A and B, A and C, B and C, or A and B and C. A description such as "a first A", "a second A", or the like in the embodiments of this application is used only to distinguish between a plurality of As, and is not used to express another meaning.

A person of ordinary skill in the art may be aware that, the units and steps in the examples described with reference to the embodiments disclosed in this specification may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some transceivers, and indirect couplings or communication connections between the apparatuses or units may be electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present application.

In addition, functional units in the embodiments of the present application may be integrated into one processor, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present application may be implemented by hardware, firmware or a combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. For example, the computer-readable medium may include but is not limited to a RAM, a ROM, an EEPROM, a CD-ROM, or another optical disc storage or disk storage medium, or another magnetic storage device, or any other medium that can be used to carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital STA line (DSL) or wireless technologies such as infrared ray, radio and microwave, the coaxial cable, optical fiber/cable, twisted pair, DSL or wireless technologies such as infrared ray, radio and microwave are included in a definition of a medium to which they belong. For example, a disk (Disk) and a disc (disc) used by the present application include a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

A person skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described according to flowcharts and/or block diagrams of the methods, devices (systems), and computer program products provided in the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device, so that the instructions executed by the computer or the processor of any other programmable data processing device can implement a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although optional embodiments of the present application have been described, a person skilled in the art can make changes and modifications to these embodiments once they learn the basic inventive concept. Therefore, the following claims are intended to be construed as to cover the optional embodiments and all changes and modifications falling within the scope of the present application.

What is claimed is:

1. A method, comprising:
   receiving, by a station, a respective message from each access point (AP) of a plurality of APs, each message carrying a wake-up radio load information element, and each wake-up radio load information element comprising:
   load information of at least one wake-up radio channel managed by a corresponding AP of the plurality of APs, the corresponding AP of the plurality of APs being the AP from which the message is received by the station; and
   a maximum sleep time of the corresponding AP;
   selecting, by the station and according to the load information and the maximum sleep time, a target AP from the plurality of APs; and
   associating, by the station, with the target AP.

2. The method according to claim 1, wherein the load information of the at least one wake-up radio channel managed by the corresponding AP indicates channel usage of each channel of the at least one wake-up radio channel.

3. The method according to claim 2, wherein selecting the target AP comprises:
- selecting an idle target channel according to the channel usage of each channel of the at least one wake-up radio channel; and
- selecting an AP corresponding to the idle target channel as the target AP.

4. The method according to claim 1, wherein:
- the at least one wake-up radio channel managed by the corresponding AP comprises a primary channel and at least one secondary channel; and
- the load information of the at least one wake-up radio channel managed by the corresponding AP indicates:
  - channel usage of the primary channel; or
    - the channel usage of the primary channel and channel usage of each channel of the at least one secondary channel.

5. The method according to claim 4, wherein selecting the target AP comprises:
- selecting, according to the channel usage of the primary channel, the target AP from the plurality of APs.

6. The method according to claim 1, wherein each wake-up radio load information element further comprises a quantity of stations equipped with a wake up receiver and associated with the corresponding AP.

7. The method according to claim 1, further comprising:
- receiving, by the station from the target AP, a wake-up packet comprising a legacy preamble and a payload, the payload comprising a wake-up preamble and wake-up receiver identifying information.

8. The method according to claim 7, wherein receiving the wake-up packet comprises:
- receiving, by the station from the target AP, the payload using amplitude-shift keying modulation.

9. An apparatus, comprising:
- a transceiver;
- a processor; and
- a non-transitory computer-readable storage medium storing a program to be executed by the processor, the program including instructions to:
  - receive, using the transceiver, a respective message from each access point (AP) of a plurality of APs, each message carrying a wake-up radio load information element, and each wake-up radio load information element comprising:
    - load information of at least one wake-up radio channel managed by a corresponding AP of the plurality of APs, the corresponding AP of the plurality of APs being the AP from which the message is received by the apparatus; and
    - a maximum sleep time of the corresponding AP;
  - select, according to the load information and the maximum sleep time, a target AP from the plurality of APs; and
  - associate with the target AP.

10. The apparatus according to claim 9, wherein the load information of the at least one wake-up radio channel managed by the corresponding AP indicates channel usage of each channel of at least one wake-up radio channel.

11. The apparatus according to claim 10, wherein instructions to select the target AP include instructions to:
- select an idle target channel according to the channel usage of each channel of the at least one wake-up radio channel; and
- select an AP corresponding to the idle target channel as the target AP.

12. The apparatus according to claim 9, wherein:
- the at least one wake-up radio channel managed by the corresponding AP comprises a primary channel and at least one secondary channel; and
- the load information of the at least one wake-up radio channel managed by the corresponding AP indicates:
  - channel usage of the primary channel; or
    - the channel usage of the primary channel and channel usage of each channel of the at least one secondary channel.

13. The apparatus according to claim 12, the instructions to select the target AP include instructions to:
- select, according the channel usage of the primary channel, the target AP from the plurality of APs.

14. The apparatus according to claim 9, wherein each wake-up radio load information element further comprises a quantity of stations equipped with a wake up receiver and associated with the corresponding AP.

15. The apparatus according to claim 9, wherein the program includes further instructions to:
- receive, using the transceiver, a wake-up packet comprising a legacy preamble and a payload, the payload comprising a wake-up preamble and wake-up receiver identifying information.

16. A method, comprising:
- generating, by an apparatus, a message, the message carrying a wake-up radio load information element, and the wake-up radio load information element comprising:
  - load information of at least one wake-up radio channel managed by an access point (AP); and
  - a maximum sleep time of the AP; and
- sending, by the apparatus, the message.

17. The method according to claim 16, wherein the load information of the at least one wake-up radio channel managed by the AP indicates channel usage of each channel of the at least one wake-up radio channel.

18. The method according to claim 16, wherein:
- the at least one wake-up radio channel managed by the AP comprises a primary channel and at least one secondary channel; and
- the load information of the at least one wake-up radio channel managed by the AP indicates:
  - channel usage of the primary channel; or
    - the channel usage of the primary channel and channel usage of each channel of the at least one secondary channel.

19. The method according to claim 16, wherein the wake-up radio load information element further comprises a quantity of stations equipped with a wake up receiver and associated with the AP.

20. The method according to claim 16, further comprising:
- send a wake-up packet comprising a legacy preamble and a payload, the payload comprising a wake-up preamble and wake-up receiver identifying information.

* * * * *

UNITED STATES PATENT AND TRADEMARK OFFICE
CERTIFICATE OF CORRECTION

PATENT NO.         : 10,924,991 B2
APPLICATION NO.    : 16/423717
DATED              : February 16, 2021
INVENTOR(S)        : Ming Gan et al.

It is certified that error appears in the above-identified patent and that said Letters Patent is hereby corrected as shown below:

In the Claims

In Column 17, Line 60, Claim 10, delete "of at least" and insert --of the at least--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*